United States Patent [19]

Yamazaki

[11] 3,769,612

[45] Oct. 30, 1973

[54] COMPRESSING AND/OR EXPANDING CIRCUIT HAVING NON-LINEAR CONTROL CIRCUIT TO REDUCE MODULATION NOISE

[75] Inventor: Masami Yamazaki, Zama, Japan

[73] Assignee: Victor Company of Japan, Ltd., Kanagawa, Japan

[22] Filed: Apr. 24, 1972

[21] Appl. No.: 246,721

[30] Foreign Application Priority Data

Apr. 24, 1971 Japan ................................ 46/26958

[52] U.S. Cl. ........................ 333/14, 307/237, 325/65, 330/29, 330/86

[51] Int. Cl. ............................................ H04b 1/64

[58] Field of Search ...................... 333/14, 17, 81 R; 330/29, 145, 86; 325/62, 65; 179/1 P, 15 AV, 100.2 K; 323/66; 307/237, 264

[56] References Cited

UNITED STATES PATENTS

| | | | |
|---|---|---|---|
| 2,193,966 | 3/1940 | Jones | 333/14 |
| 3,215,940 | 11/1965 | Fisher | 330/29 X |
| 2,920,291 | 1/1960 | Brundage | 333/14 |
| 3,631,365 | 12/1971 | Dolby | 333/14 |

*Primary Examiner*—Paul L. Gensler
*Attorney*—Louis Bernat

[57] ABSTRACT

A compressing and/or expanding circuit comprises a compressor or an expandor including a control element. In response to the level of an input signal, a signal level adjusting circuit imparts a small (or large) attenuation amount to the input signal when the level is low (or high). A control circuit generates a control signal which is applied to the control element in the compressor or the expandor, in response to the level of an output signal from the signal level adjusting circuit. A signal passed through the compressing or the expanding circuit is substantially free from modulation noise.

16 Claims, 10 Drawing Figures

COMPRESSING AND/OR EXPANDING CIRCUIT HAVING NON-LINEAR CONTROL CIRCUIT TO REDUCE MODULATION NOISE

BACKGROUND OF THE INVENTION

This invention relates to a compressing and/or expanding circuit and more particularly to a circuit adapted for reducing noise and improving the signal-to noise ratio by the use of a compressor and an expandor.

A system for noise reduction by the use of a compressor and an expandor is known as the compandor system. This system has found a wide field of applications in communication systems for signal transmission and reception. It is also used in recording and reproducing systems in which signals are recorded on a recording medium such as a magnetic tape or a record disc, and the recorded signals are reproduced therefrom.

The applicant has previously proposed a compandor system with the circuit structure described in U.S. patent application Ser. No. 149,687, filed June 3, 1971, entitled "NOISE REDUCTION SYSTEM AND APPARATUS USING A COMPRESSION AND EXPANSION SYSTEM". According to this system, there is provided, on the signal transmission side, a compressor and a circuit for controlling the compressor in response to its output. On the receiving side, there is an expandor and a circuit for controlling the expandor in response to its input. The compressor is provided with a variable attenuation network including a control element, whereas the expandor is composed mainly of a negative feedback amplifier including a control element in its feedback loop. The input signal to the compressor, output signal from the compressor (i.e., input signal to the expandor), and the output signal from the expandor will now be denoted respectively by X, Y, and Z. Further, the compression ratio of the compressor, the amplification factor of the amplifier in the expandor, and the feedback factor will be denoted respectively by $K$, $A$, and $\beta$. If the compression ratio and the feedback factor are so selected that $K = \beta$, the relationships between $X$, $Y$, and $Z$ can be expressed as follows.

$$Y = KX \quad (1)$$

$$Z = AY/1 + A\beta \quad (2)$$

It is to be noted that A is much greater than unity, or $A >> 1$, in Equation (2).

Then, Equation (2) reduces to $$Z = Y/\beta \quad (3)$$

Combining Equations (1) and (3) under the condition $K = \beta$ produces a relationship between the output signal from the expandor and the input signal to the compressor which can be expressed as $$Z = KX/\beta = X \quad (4)$$

Accordingly, the input/output characteristic of a signal for the overall compandor system becomes linear and the noise in the transmission path can be effectively reduced.

There remains, however, a difficult problem yet to be solved in the above-mentioned compandor system, i.e., the occurrence of modulation noise origination from the characteristic of a gain control element provided in both the compressor and the expandor.

The gain control element commonly employed for such applications uses a semiconductor, for example, a transistor or a field-effect transistor (FET), having a characteristic such that its resistance value is large (small) for a small (large) control signal voltage. This control signal voltage vs. resistance value characteristic curve is not linear. In contrast, the control circuit produces a control signal voltage which varies linearly with the input signal level. For this reason, the input/output characteristic of the compressor or the expandor is determined by a characteristic of the control element, per se. This characteristic produces a steep portion in the compandor response curve, as will be described hereinafter. Therefore, the level of background noise in the output signal from the expandor becomes high or low in accordance with the magnitude of the signal level. This background noise is commonly referred to as a "modulation noise."

SUMMARY OF THE INVENTION

Accordingly, it is a general object of this invention to provide a novel and useful noise reduction apparatus incorporating a compressing and/or expanding circuit which will afford a best solution to the abovementioned problems.

Another object of the intention is to provide a circuit capable of carrying out signal compression and/or expansion effectively without producing modulation noise.

Further objects and features of this invention will be apparent from the following detailed description when read in conjunction with the accompanying drawings.

DETAILED DESCRIPTION

Figure 1A:
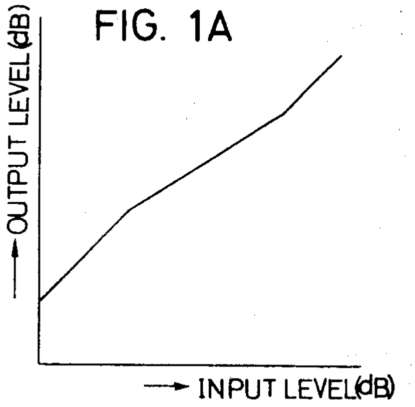
FIGS. 1A and 1B are graphical representations respectively indicating input/output signal level characteristics of a compressor and an expandor of conventional design.
Figure 1B:
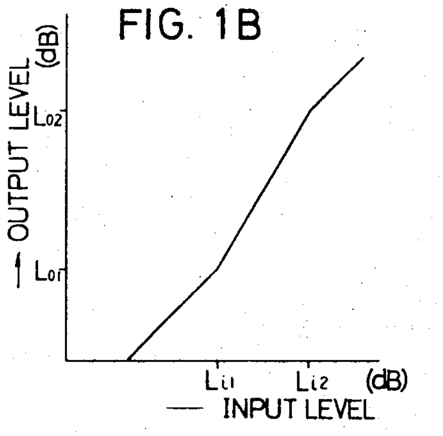

The cause of modulation noise in a conventional compressor or an expandor will first be considered. The control element contained in a compressor or an expandor has a non-linear characteristic, as mentioned previously. On the other hand, the control signal voltage produced in the control circuit has a linear characteristic with respect to the input signal level. For this reason, the compression and expansion characteristics of a compressor and an expandor of conventional design are respectively as shown in FIGS. 1A and 1B. An inspection of these two curves readily reveals that an intermediate portion of each of the characteristics exhibits a large control ratio (compression or expansion ratio).

Figure 2A:
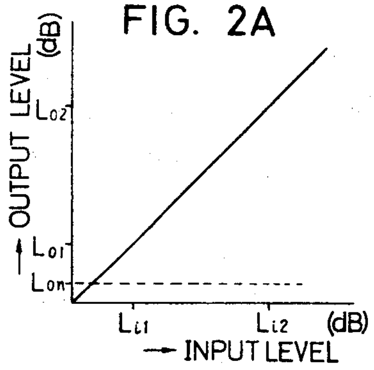
FIGS. 2A, 2B, and 2C are graphical representations respectively indicating three different types of characteristics for explaining the relationship between the input signal level and the output signal level.

If the input/output characteristic is as illustrated in FIG. 2A, the variation of the output signal level (Lo2–Lo1) is always in a one-to-one correspondence with respect to the variation of the input signal level (Li2–Li1). That is, a relationship (Li2–Li1) = (Lo2–Lo1) is as in a conventional amplifier. The level of noise Lon in the output signal remains the same, in the absence of the compression or expansion function, irrespective of the input signal level. For this reason, no modulation noise can occur in an ordinary amplifier while it is in operation.

Figure 2B:
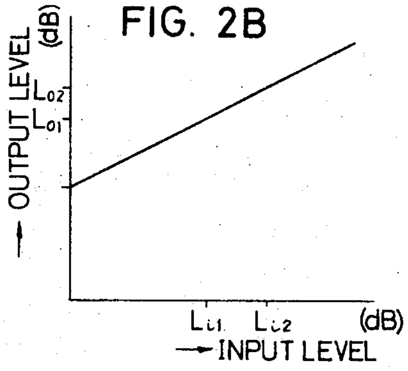
Figure 2C:
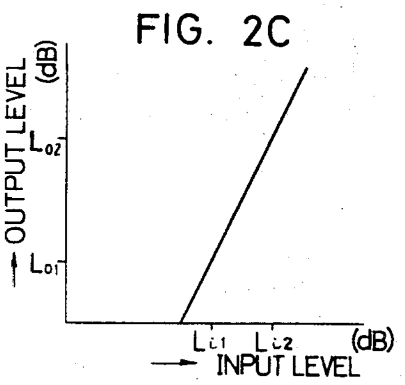

The characteristics of the compressor and the expandor corresponding to the intermediate portions of the curves shown in FIGS. 1A and 1B are respectively as illustrated in FIGS. 2B and 2C. The compressor exhibits a relationship of the input/output signal level variation expressed as (Li2–Li1) > (Lo2–Lo1), whereas the expandor exhibits a relationship (Li2–Li1) < (Lo2–Lo1). Accordingly, the level of noise contained in the output signal from a compandor varies with the input/output characteristic of an expandor. In other words, occurrence of modulation noise is a defect inherent in a conventional compandor. Thus, the modulation noise in a compandor is caused by the variation of the noise level appearing in the output signal of an expandor, and the amount varies according to the input/output characteristic of the expandor. Therefore, the modulation noise appearing in the output signal of the expandor can be effectively reduced by designing the input/output characteristic of the expandor approximately the same as that of an ordinary amplifier as shown in FIG. 2A.

In order for the compandor to fulfill the proper function of compression and expansion, it is necessary for the input/output characteristics of the compressor and the expandor to be designed as shown in FIGS. 2B and 2C, respectively.

With a conventional system for accomplishing the signal compression and expansion, it has been taken for granted that it is necessary to design the input/output signal level characteristics as shown in FIGS. 1A and 1B, respectively, on the basis of the characteristics of the control circuits and the characteristics of the control elements.

Even when the input signal to the compressor is made equal to the output signal from the expandor, the output signal level varies markedly with but a small change in the input signal level. The modulation noise is auditorily sensed to be more intense than it actually is because of the presence of a steep part in the input/output characteristic of the expandor, that is the portion expressed as (Lo2–Lo1) >> (Li2–Li1) in the curve of FIG. 1B.

Accordingly, this invention contemplates a circuit capable of performing optimum compression and expansion of signals without the accompanying occurrence of modulation noise. The principles of this invention will now be described in more detail with reference to FIG. 3 and subsequent figures.

Figure 3:
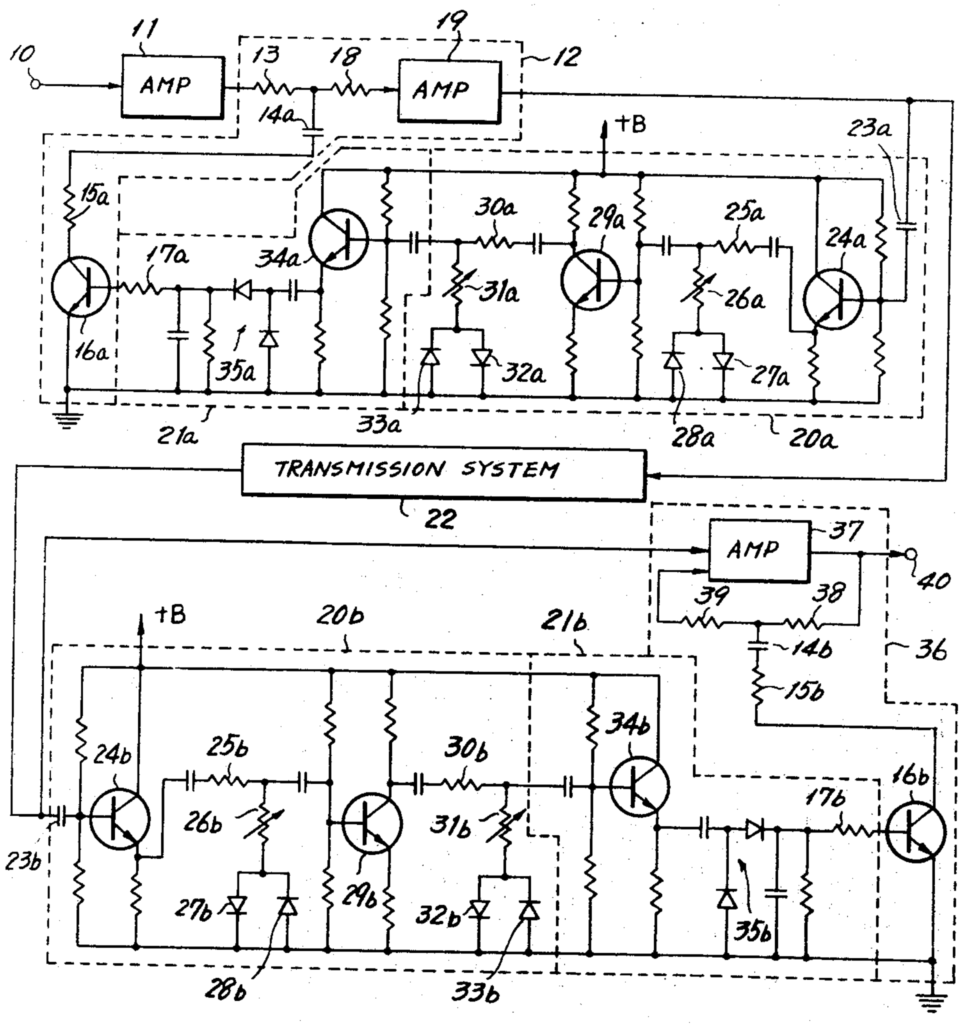
FIG. 3 is a schematic circuit diagram of one embodiment of a compressing and expanding circuit according to this invention.

FIG. 3 shows a schematic circuit diagram of a compandor circuit embodying this invention. In the compression system, an input signal applied to an input terminal 10 is fed to a compressor 12 after the signal has been amplified by an amplifier 11. In the compressor 12, a resistor 13, a capacitor **14*a*, a resistor 15*a*, and a transistor 16*a* constitute, in combination, a variable attenuation network. The transistor 16*a* acts as a control element and is of the emitter-grounded type. The resistor 15*a* is connected to the collector electrode. The resistance value of the transistor is caused to vary in accordance with a control voltage applied to the base through a resistor 17*a*, from a control circuit 21*a*. By the controlled operation of the transistor 16*a***, the amount of attenuation is caused to vary with respect to the input signal, whereby the required compressive action is carried out.

An output signal from the variable attenuation network is fed to an amplifier 19 via a resistor 18. The output of the amplifier 19, or an output signal from the compressor 12, is delivered to a transmission system 22 which may be a signal transmission channel, a recording and reproducing system comprising a recording medium, or the like.

On the other hand, part of the output from the amplifier 19 is also fed to an adjusting circuit **20*a* which constitutes, together with the adjusting circuit in the expansion system, an integral part of the circuitry according to this invention. The adjusting circuit 20*a* is composed of a transistor 24*a*. A signal is applied through a capacitor 23*a* to the base of the transistor. As its emitter load circuit, a circuit is connected to the transistor 24*a* comprising a resistor 25*a*, a variable resistor 26*a*, and a pair of diodes 27*a* and 28*a* connected in parallel and in opposite polarilies. A transistor 29*a* is connected in cascade with the circuit. Another circuit is connected to the collector of transistor 29*a* as its load circuit, comprising a resistor 30*a*, a variable resistor 31*a*, and a pair of diodes 32*a* and 33*a*** connected in parallel and in opposite polarities.

In this embodiment, transistor amplifiers are connected in two cascaded stages. Each amplifier has a load circuit in which a pair of diodes act as the nonlinear circuit elements and two resistors connected in series act with the diodes as the linear circuit elements. However the number of amplification stages is by no means restricted to two.

A signal passing through the adjusting circuit 201 is fed to the control circuit **21*a* to undergo further amplification by a transistor 34*a*. The amplified signal is rectified by a rectifying time-constant circuit 35*a* to become a control signal voltage. The control signal voltage from the control circuit 21*a*, as mentioned previously, controls the transistor 16*a* in the compressor 12**.

In the adjusting circuit **20*a*, a signal applied to the base of the transistor 24*a*, of the emitter follower type, undergoes adjustment of a low level portion of the signal in a circuit connected as the load, in which resistors 25*a* and 26*a* and a combination of diodes 27*a* and 28*a* are connected. The action of adjustment in this case in such that a small attenuation amount is provided for a low level portion of the input signal. The signal has a low level portion which has been adjusted. It undergoes further adjustment for its high level portion responsive to the load circuit connected to the transistor 29*a* and comprising resistors 30*a* and 31*a* and a combination of diodes 32*a* and 33*a*. The adjustment action in this case, provides a large amount of attenuation for a high level portion of the signal. The amount of the adjustment provided for the signal by the adjusting circuit 20***a* is designed approximately to coincide with the overall amplification factor of the adjusting circuit 20*a*.

Needless to say, the larger the number of the adjusting stages involved in the adjusting circuit, the greater is the amount of adjustment to be applied to the signal in the adjusting circuit 20*a*. Hence, the added stages give a greater the range of varations of the signal level in which the compression or expansion takes place. In this embodiment, the adjusting circuit 20*a* is designed to perform a conversion of a level variation quantity of an input signal into an envelope variation quantity. It is to be noted that, for this reason, a signal applied to the control element is not deleteriously affected, no matter how many non-linear circuit elements may be contained in the circuit.

A signal which has been compressed in the compression system as mentioned previously, and delivered to a transmission system 22, is fed to an expandor 36 is the expansion system. At the same time, part of the input is fed to an adjusting circuit 20*b*. The adjusting circuit 20*b* is designed to have the same circuit structure as the adjustment circuit 20*a*. Therefore, a detailed description of the circuit is omitted herein. The reference numerals are merely used to designate like circuit elements, except that subscripts "*a*" are replaced by "*b*."

A signal which has been given a small (large) attenuation when the signal level is low (high) is fed to a control circuit 21*b*. The control circuit 21*b* has the same circuit construction as the previously mentioned control circuit 21*a*. Therefore, the same reference numerals are used for like circuit elements, except that subscripts "*a*" are again replaced by "*b*."

The expandor 36 comprises a negative feedback amplifier 37 and a variable attenuation network connected to the junction of resistors 38 and 39 inserted in the feedback loop of the amplifier. Another feedback loop comprises a capacitor 14*b*, a resistor 15*b*, and a transistor 16*b*. The amplifier 37 is provided with these negative feedback loops to vary the gain in accordance with the magnitude of a control signal voltage delivered from the control circuit 21*b* and applied to the base of the transistor 16*b* through the resistor 17*b*, thereby to perform the required signal expansion. The amount of noise has been greatly reduced in the expanded output signal from the expandor 36 and is derived from an output terminal 40.

Figure 4:
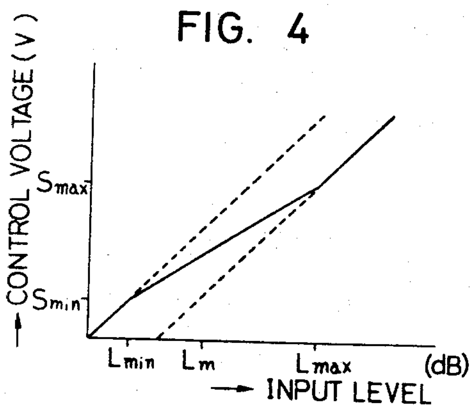
FIG. 4 is a graphical representation indicating an input signal vs. control signal voltage characteristic.

Shown in FIG. 4 is a characteristic curve indicating the control signal voltage produced in the control circuit 21*a* (21*b*) in response to a signal, the level of which has been adjusted by the adjusting circuit 20*a* (or 20*b*) as a function of the level of an input signal to the adjusting circuit 20*a* (20*b*). In a conventional control circuit, the variable range for the input signal level corresponding to the maximum and minimum values of the control signal voltage is comparatively narrow as indicated by an interval between L*m* and Lmax in FIG. 4. In contrast, with the control circuit of this invention, the range for the input signal level corresponding to the maximum and minimum values Smax and Smin of the control signal voltage has been considerably extended, as indicated by an interval between Lmax and Lmin in FIG. 4.

Figure 5A:
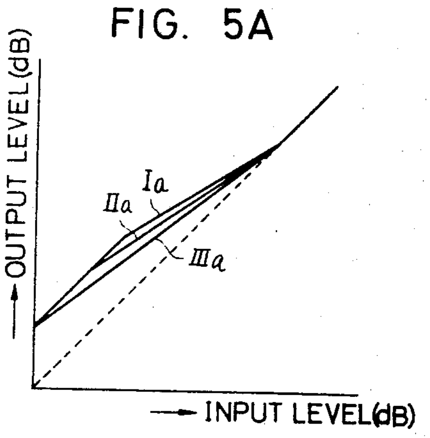
FIGS. 5A and 5B are graphical representations respectively indicating the input/output characteristic curves of a compressor and an expandor.
Figure 5B:
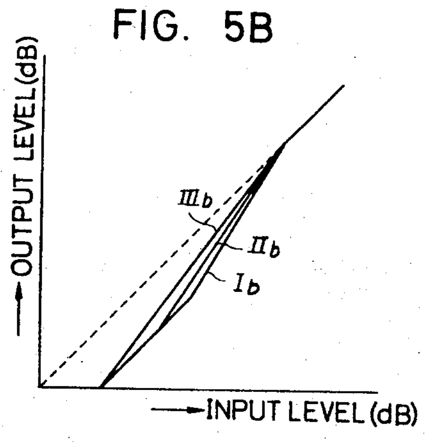

A comparison between an input/output characteristic of a conventional compressor and that of a compressor according to this invention is indicated in FIG. 5A. A similar comparison with respect to a conventional expandor and an expandor according to this invention is indicated in FIG. 5B. In these figures, curves I*a* and I*b* represent respectively the input/output characteristic of the conventional compressor and that of the conventional expandor. These curves should be the same as the characteristic curves shown in FIGS. 1A and 1B, respectively. As mentioned previously, there is an intermediate portion exhibiting a large control ratio (compression or expansion ratio) in both characteristic curves. Curves II*a* and III*a* and curves II*b* and III*b* correspond respectively to the input/output characteristics of compressors and expandors according to this invention. A comparison of these curves readily reveals that the compressor and the expandor having the adjusting circuits 20*a* and 20*b* (according to this invention) exhibit input/output characteristics such that the control ratio varies gradually with respect to the variations in the input signal level over a wide range in response to the control signal voltage characteristic shown in FIG. 4.

The degree to which the range of variation in the input signal level can be extended is governed by the number of cascade connection stages of amplifiers, in the adjusting circuits 20*a* and 20*b*. To each amplifier stage a load circuit is connected, composed of the linear circuit elements and the non-linear circuit elements connected in series therewith. The manner in which the constants of the linear and non-linear circuit elements are selected also extends the range. It is possible, by suitably selecting these factors, to set the characteristics of the compressor and the expandor midway between the curves I*a* and III*a* and between the curves I*b* and III*b* in FIGS. 5A and 5B, respectively.

Figure 6:
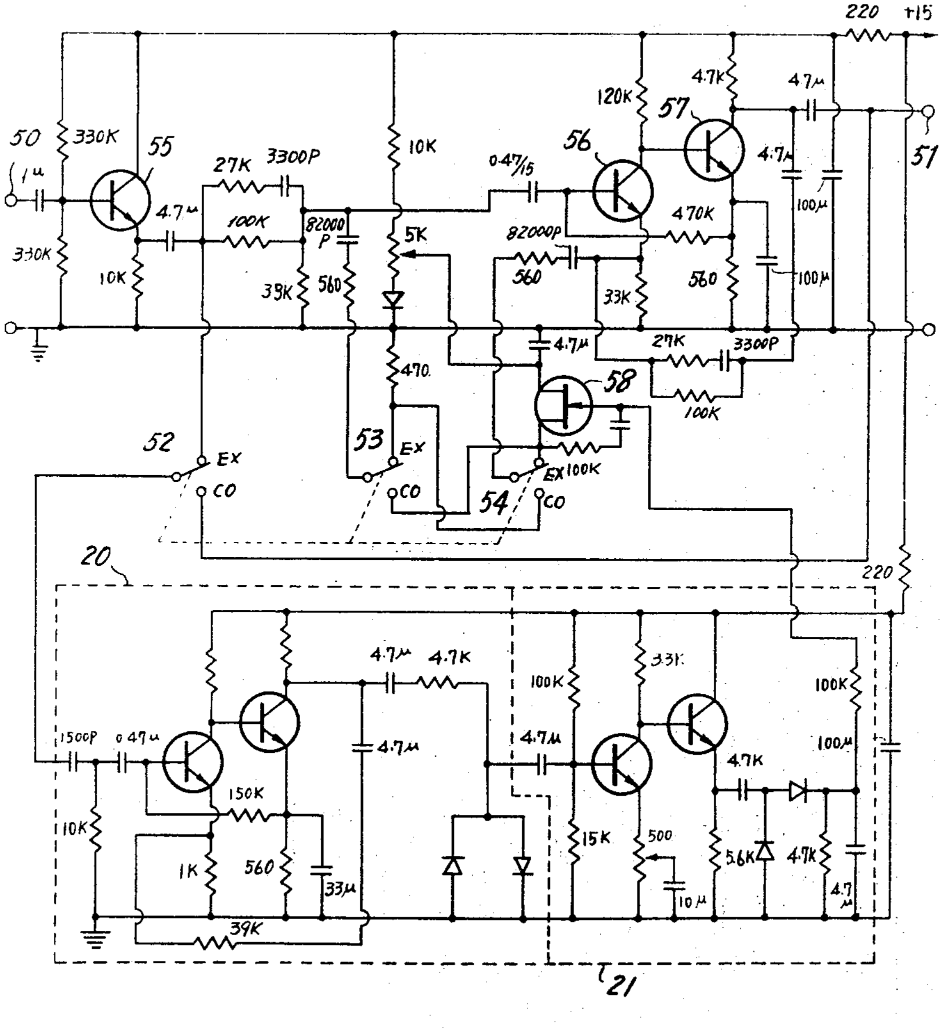
FIG. 6 is a practical circuit embodying this invention which can be used as either a compressor or an expandor depending upon a switching operation.

Referring to FIG. 6, one embodiment shown therein of a compressing/expanding circuit embodying this invention is highly suitable for use in a recording and reproducing apparatus, in that it can be optionally used as either a compressor or an expandor by a switching operation.

By placing the apparatus in the recording mode, a signal to be recorded is applied to an input terminal 50. The movable contacts of the interlocked switches 52, 53, and 54 are respectively connected to the contacts "CO." The input signal applied to the terminal 50 is amplified by a transistor amplifier 55, and the amplified signal is fed to another amplifier including transistors 56 and 57. A part of the output from the collector of the transistor 57 is fed to an adjusting circuit 20 through the switch 52 which is connected to the contact "CO." The adjusting circuit 20 and the control circuit 21, each constitute a single circuit respectively corresponding to the adjusting circuits 20*a* and 20*b* and the control circuits 21*a* and 21*b* in the previously described compressor and expandor. A signal which is fed to the control circuit 21 has an attenuation amount and level which has been varied and adjusted by the adjusting circuit 20 in response to the level of an input signal to the circuit. The output control signal voltage from the control circuit 21 is applied to the gate of a field-effect transistor 58 (FET).

The FET 58 is placed in a state under which its drain and source are respectively connected, via switch 53, between ground and a signal transmission path extending from the transistor 55 to the transistor 56. In other words, the amplifier including the transistors 56 and 57 and the FET 58 operate as a compressor in response to a control signal voltage applied to the FET 58. Accordingly, a compressed signal can be derived from an output terminal 51, and this signal is recorded on a recording medium.

When the recording and reproducing apparatus is operated in the reproducing mode, the movable contacts of the switches 52 through 54 are switched over from the contacts "CO" to "EX." Then a reproduced signal from the recorded compressed signal is applied to the input terminal 50. The reproduced signal is then amplified by the transistor amplifier 55. The amplified signal is partly fed to the transistors 56 and 57 and partly to the adjusting circuit 20 through the switch 52. In the same manner as described previously, a control signal voltage derived from the control circuit 21 is applied to the gate of the FET 58.

In this case, the FET 58 is connected to the negative feedback loop of the amplifier consisting of transistors 56 and 57. Accordingly, the gain of this negative feedback amplifier varies with the control voltage applied to the FET 58, whereby the required expansion takes place and a noise-reduced and expanded signal that has been restored to the original is available from the output terminal 51.

This invention possesses practical utility in which a compressing/expanding circuit having a highly suitable input/output characteristic for reduction of the modulation noise can be provided so as to meet the dynamic range possessed by a communication system or a recording and reproducing system in which the reduction of noise is necessary.

Further, this invention is not limited to these embodiments but various variations and modifications may be made without departing from the scope and spirit of the invention.

What is claimed is:

1. A compressing circuit comprising compressor means for compressing an input signal in response to a control signal applied thereto, signal level adjusting means for imparting a small attenuation amount to a signal supplied thereto when the level of said supplied signal is low and for imparting a large attenuation amount to said supplied signal when the level of said supplied signal is high, said signal level adjusting means being coupled to receive an output signal from said compressor means as said supplied signal, and control circuit means for generating said control signal in response to the level of a signal from said signal level adjusting means.

2. The compressing circuit according to claim 1, in which said compressor means includes a control element the resistance of which varies in response to said control signal, and said compressor means compresses the input signal supplied thereto in response to variations in resistance of said control element.

3. The compressing circuit according to claim 1, in which said signal level adjusting means adjusts the level of said supplied signal in a manner which enlarges the range of level variations of said input signal corresponding to the range of variations of said control signal.

4. The compressing circuit according to claim 1, in which said signal level adjusting means comprises at least one amplifier having a load circuit including a non-linear circuit element and a linear circuit element connected in series.

5. The compressing circuit according to claim 4, in which said linear circuit element is a resistor and said non-linear circuit element is a parallel combination of a pair of diodes connected in opposite polarity.

6. The compressing circuit according to claim 5, in which said resistor is a variable resistor.

7. An expanding circuit comprising expandor means for expanding an input signal in response to a control signal applied thereto, signal level adjusting means for imparting a small attenuation amount to a signal supplied thereto when the level of said supplied signal is low and for imparting a large attenuation amount to said supplied signal when the level of said supplied signal is high, said signal level adjusting means being coupled to receive an input signal from a compressing circuit means, and control circuit means for generating said control signal in response to the level of a signal from said signal level adjusting means.

8. The expanding circuit according to claim 7, in which said signal level adjusting means adjusts the level of said supplied signal in such a manner which enlarges the range of level variations of said input signal corresponding to the range of variations of said control signal.

9. The expanding circuit according to claim 7, in which said expandor means includes a control element the resistance of which varies in response to said control signal, and said expandor means expands the input signal supplied thereto in response to variations in resistance of said control element.

10. The expanding circuit according to claim 9, in which said expandor means comprises a negative feedback amplifier and said control element is connected to the negative feedback loop of said negative feedback amplifier.

11. The expanding circuit according to claim 7, in which said signal level adjusting means comprises at least one amplifier having a load circuit including a non-linear circuit element and a linear circuit element connected in series.

12. The expanding circuit according to claim 11, in which said linear circuit element is a resistor and said non-linear circuit element is a parallel combination of a pair of diodes connected in opposite polarity.

13. The expanding circuit according to claim 12, in which said resistor is a variable resistor.

14. A compandor circuit comprising a compressing circuit means comprising compressor means for compressing an input signal in response to a first control signal applied thereto, first signal level adjusting means for imparting a small attenuation amount to a signal supplied thereto when the level of said supplied signal is low and for imparting a large attenuation amount to said supplied signal when the level of said supplied signal is high, said first signal level adjusting means being coupled to receive an output signal from said compressor means as said supplied signal, first control circuit means for generating said first control signal in response to the level of a signal from said first signal level adjusting means; transmission system means for transmitting the compressed signal from the compressing circuit to an expanding circuit means; said expanding circuit means comprising expandor means responsive to a second control signal for expanding an input signal applied thereto from said transmission system, second signal level adjusting means for imparting a small attenuation amount to a signal supplied thereto when the level of said signal supplied thereto is low and imparting a large attenuation amount to said signal supplied thereto when the level of said signal supplied thereto is high, said second signal level adjusting means being coupled to receive an input signal from said transmission system means, and second control circuit means for generating said second control signal in response to the level of signal from said second signal level adjusting means.

15. A compressing and expanding circuit comprising means for amplifying an input signal; means comprising a control element having an impedance value which varies in response to a control signal; control circuit means for generating said control signal in response to the level of a signal applied thereto; switching means for switching over a signal path during compression periods so that an output signal from said amplifier is fed to said control circuit means as the signal applied to said control circuit means, and said control element is connected to the input side of said amplifier, and during expansion periods, an input signal to said amplifier is fed to said control circuit means as the signal applied to said control signal, said control element being connected to the negative feedback loop of said amplifier.

16. A compressing and expanding circuit comprising: an amplifier for amplifying an input signal; a control element the resistance of which varies in response to a control signal applied thereto; a signal level adjusting circuit comprising at least one amplifier to which is connected a load circuit comprising linear circuit elements and non-linear circuit elements connected in series and imparting, with an input signal for a control signal, a small attenuation amount to said input signal when the level of said input signal is low and a large attenuation amount to said input signal when the level of said input signal is high; a control circuit for generating a control signal to be applied to said control element in response to the level of an input signal from said signal level adjusting circuit; and switching means for carrying out a signal path switchover operation such that, in compression periods, an output signal from said amplifier is fed to said adjusting circuit as an input signal for said control signal, and, further, said control element is connected to the input side of said amplifier, whereas, in expansion periods, an input signal to said amplifier is fed to said signal level adjusting circuit as an input signal for said control signal, said control element being connected to the negative feedback loop of said amplifier.

* * * * *